United States Patent [19]

Coutant et al.

[11] Patent Number: 5,575,735

[45] Date of Patent: Nov. 19, 1996

[54] INTEGRATED POWER TRANSMITTING SYSTEM

[75] Inventors: Alan R. Coutant, Chillicothe; Jerry D. Marr, Metamora; Sanjay Rajagopalan, Peoria, all of Ill.

[73] Assignee: Caterpillar Inc., Peoria, Ill.

[21] Appl. No.: 416,394

[22] Filed: Apr. 6, 1995

[51] Int. Cl.$^6$ .................................................. F16H 47/04
[52] U.S. Cl. .................................. 475/72; 475/80; 477/68
[58] Field of Search ................................ 475/72, 73, 76, 475/78, 80, 82; 477/68, 69

[56] References Cited

U.S. PATENT DOCUMENTS

| | | | |
|---|---|---|---|
| 3,597,998 | 8/1971 | Ebert | 475/80 X |
| 3,733,931 | 5/1973 | Nyman et al. | 475/82 X |
| 4,019,404 | 4/1977 | Schauer | 475/82 |
| 4,947,687 | 8/1990 | Martini et al. | 477/68 X |
| 5,121,603 | 6/1992 | Widemann | 60/447 |
| 5,203,168 | 4/1993 | Oshina et al. | 60/426 |
| 5,207,736 | 5/1993 | Fredriksen | 477/68 X |
| 5,222,921 | 6/1993 | Garcia | 475/72 |

FOREIGN PATENT DOCUMENTS 406026562  2/1994  Japan .................................. 475/72

Primary Examiner—Khoi Q. Ta
Attorney, Agent, or Firm—J. W. Burrows

[57] ABSTRACT

An integrated power transmitting system includes a hydrostatic transmission and a mechanical transmission both being driven by an engine. The output of the hydrostatic transmission and the mechanical transmission are both selectively coupled to a work system through a final output shaft. A sensing arrangement senses the transmission input speed, the output of the hydrostatic transmission and the speed of the final output shaft and delivers the signals to the microprocessor. The microprocessor processes the received signals on a continuous basis and delivers a first set of command signals to control operation of the hydrostatic transmission and a second set of control signals to selectively control forward and reverse direction and high and low clutches within the mechanical transmission. A planetary arrangement within the mechanical transmission sums the speed of the hydrostatic transmission with a full range forward and reverse gear mechanism. This arrangement provides a smooth and continuous change in the speed of a machine in both the forward and reverse directions throughout its entire speed range.

6 Claims, 1 Drawing Sheet

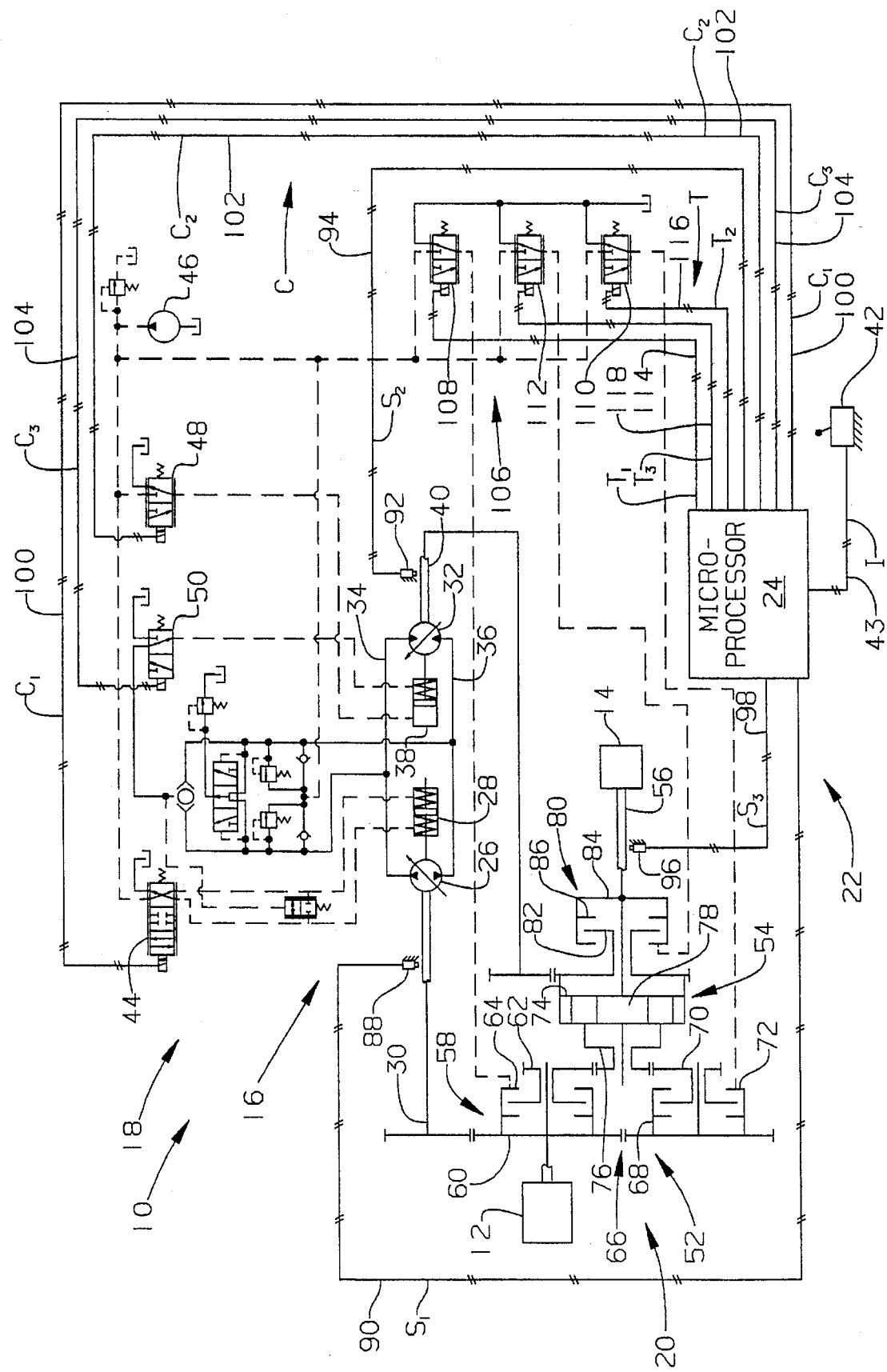

INTEGRATED POWER TRANSMITTING SYSTEM

TECHNICAL FIELD

The present invention generally relates to a power transmitting system and, more particularly, to an integrated power transmitting system in which an engine, a hydrostatic transmission, and a mechanical transmission each interacts with the other in conjunction with a microprocessor to provide a constant infinitely variable output to a work system.

BACKGROUND ART

In many systems, the mechanical transmission does not interact with another power source such as a hydrostatic transmission to effectively utilize the power being transmitted by the engine. When various arrangements in a system do not cooperate with other arrangements, the power drain on the engine may be unacceptable since it may cause the engine to lug and/or stall. It is beneficial to allow the power of the engine to be delivered to the various arrangements within the system in an effective and efficient manner.

DISCLOSURE OF THE INVENTION

In accordance with one aspect of the present invention, an integrated power transmitting system is provided for a machine having a source of power, such as an engine, and a work system. The integrated power transmitting system includes a hydrostatic transmission having a variable displacement pump drivingly connected to the source of power and a variable displacement motor having an output shaft being fluidly connected to the variable displacement pump. A control arrangement is provided having an input command operative to control the displacement of the variable displacement pump between its minimum and maximum displacement positions and once the variable displacement pump reaches its maximum displacement position to control the displacement of the variable displacement motor between its maximum and minimum displacement positions in response to the input command establishing the desired speed of the output shaft of the variable displacement motor. A mechanical transmission is also provided and is drivingly connected to the source of power. The mechanical transmission has a full range forward and reverse gear mechanism connected to the source of power, a planetary arrangement connected to both a full range forward and reverse gear mechanism and the output shaft of the variable displacement motor. The planetary arrangement is operative to sum the outputs from the gear mechanism and the variable displacement motor. A final output shaft is connected between the planetary arrangement and the work system. A sensing arrangement is operative to sense the speed of the variable displacement pump, the speed of the final output shaft connected to the work system, the speed of the output shaft from the variable displacement motor, and the magnitude and direction of the desired input command. A microprocessor is operative to receive the signals from the sensing arrangement, process the signals and deliver a first set of control signals to progressively control the displacement of the variable displacement pump and the variable displacement motor, and a second set of control signals to control the operation of the mechanical transmission.

BRIEF DESCRIPTION OF THE DRAWING

The drawing is a partial schematic and a partial diagrammatic representation of an integrated power transmitting system incorporating an embodiment of the present invention.

BEST MODE FOR CARRYING OUT THE INVENTION

Referring to the drawing, an integrated power transmitting system 10 is generally indicated for use in a machine (not shown) having a source of power such as an engine 12, and a work system 14.

The integrated power transmitting system 10 includes a hydrostatic transmission 16, a control arrangement 18, a mechanical transmission 20, a sensing arrangement 22, and a microprocessor 24. The hydrostatic transmission 16 includes a variable displacement pump 26 having a displacement controller 28 operative to change the displacement of the variable displacement pump 26 between its maximum and minimum positions. The variable displacement pump 26 is drivingly connected to the engine 12 through a pump drive arrangement 30. A variable displacement motor 32 is fluidly connected to the variable displacement pump 26 through conduits 34,36 and has a displacement controller 38 operative to change the displacement thereof between its maximum and minimum positions. Output shaft 40 extends from the variable displacement motor and operative to transmit torque therefrom.

The displacement controller 28 of the variable displacement pump 26 is spring centered to a position at which the displacement from the variable displacement pump 26 is zero and movable in either direction responsive to receiving a pressurized fluid signal. The displacement controller 38 of the variable displacement motor 32 is spring biased to a first position at which the displacement of the variable displacement motor 32 is at its maximum displacement position and movable toward a minimum displacement position in response to receipt of a pressurized fluid signal to the displacement controller 38.

The control arrangement 18 includes an operator control mechanism 42 which allows an operator to generate an input command "I" through an electrical line 42 to the microprocessor 24. The input command "I" is representative of the desired direction of travel and the magnitude of the speed desired. The control arrangement 18 includes a first solenoid operated proportional valve 44 operatively connected between the displacement controller 28 of the variable displacement pump 26 and a source of pressurized pilot fluid, such as a pilot pump 46. The solenoid operated proportional valve 44 controls the pressurized fluid from the pilot pump 46 to the displacement controller 28 in response to receipt of an electrical control signal "P". The control arrangement 18 also includes a second solenoid operated proportional valve 48 operatively connected between the pilot pump 46 and the displacement controller 38 of the variable displacement motor 32. The second solenoid operated proportional valve 48 is operative to control the flow of pressurized fluid to the displacement controller 38 in response to another electrical signal. A solenoid operated valve 50 is included and operatively connected between the spring chamber of the displacement controller 38 of the variable displacement motor 32 and the highest pressure signal in the conduits 34,36. The solenoid operated valve 50 is movable to a position to connect the highest pressure signal in the conduits 34,36 to the spring chamber of the displacement controller 38 in response to an electrical signal.

The mechanical transmission 20 includes a full range forward and reverse gear mechanism 52, a planetary arrangement 54, and a final output shaft 56 connected to the work system 14. The full range forward and reverse gear mechanism 52 includes a first gear mechanism 58 having an input 60 drivingly connected to the engine 12 and an output 62 with a fluid operated clutch 64 disposed therebetween. A second gear mechanism 66 has an input 68 drivingly connected to the engine 12 and an output 70 with a second fluid clutch 72 disposed therebetween.

The planetary arrangement 54 typically includes a ring gear 74, a planet and carrier gears 76 and a sun gear 78. The ring gear 74 is operatively connected to the output shaft 40 of the variable displacement motor 32. The planet and carrier gears 76 are operatively connected to the output 62 of the first gear mechanism 58 and the output 70 of the second gear mechanism 66. The sun gear 78 is operatively connected to the final output shaft 56. A third gear mechanism 80 includes an input 82 operatively connected to the ring gear 74, an output 84 connected to the final output shaft 56 and a third fluid clutch 86 disposed therebetween.

The sensing arrangement 22 includes a first speed sensor 88 operatively associated with the pump drive arrangement 30 to sense the transmission input speed thereof and deliver an electrical signal "$S_1$" to the microprocessor 24 through an electrical line 90. A second speed sensor 92 is operatively associated with the output shaft 40 of the variable displacement motor 32 to sense the speed thereof and deliver an electrical signal "$S_2$" through an electrical line 94 to the microprocessor 24. A third speed sensor 96 is operatively associated with the final output shaft 56 to sense the speed thereof and deliver an electrical signal "$S_3$" through an electrical line 98 to the microprocessor 24. The sensing arrangement 20 also includes the input command signal "I" which represents the direction of travel and magnitude of the speed thereof.

The microprocessor 24 is operative to deliver a first set of control signals "C" to control operation of the hydrostatic transmission 16. The first set of control signals "C" includes a first control signal "$C_1$" delivered to the first solenoid operated proportional valve 44 through an electrical line 100, a second electrical signal "$C_2$" delivered to the second solenoid operated proportional valve 48 through an electrical line 102, and a third control signal "$C_3$" delivered to the solenoid operated valve 50 through an electrical line 104.

The microprocessor 24 also delivers a second set of control signals C to a valve mechanism 106 for control of the first, second and third fluid clutches 64,72,86. The valve mechanism 106 includes first, second and third electrically actuated proportional valves 108,110,112 each being operatively disposed between the pilot pump 46 and the respective ones of the first, second and third fluid clutches 64,72,86. Each of the first, second and third electrically actuated proportional valves 108,110,112 is operative to direct pressurized fluid from the pilot pump 46 to the respective first, second and third fluid clutches 64,72,86 in response to the second set of control signals T delivered from the microprocessor 24.

The second set of control signals "T" includes a first control signal "$T_1$" delivered to the first electrically actuated proportional valve 108 through an electrical line 114, a second electrical control signal "$T_2$" delivered to the second electrically actuated proportional valve 110 through an electrical line 116 and a third control signal "$T_3$" delivered to the third electrically actuated proportional valve 112 through an electrical line 118.

INDUSTRIAL APPLICABILITY

The integrated power transmitting system 10 constructed in accordance with the teachings of the present invention advantageously provides a system wherein the hydrostatic transmission 16 and the mechanical transmission 20 both interact through the microprocessor 24 to provide a consistent and efficient output to the work system 14 which enables the engine 12 to operate at its best efficiency.

In the operation of the subject invention, with the engine 12 operating at a predetermined speed level, the variable displacement pump 26 at its zero displacement position, and the first, second and third fluid clutches 64,72,86 disengaged, the machine is at zero speed. If the operator elects to move the machine forward at relatively low ground speeds, for example, zero to 6 mph, the operator makes an input to the input controller 42 which directs the command signal "I" through the electrical line 43 to the microprocessor 24. If, for example, the operator selects a ground speed of 3 mph in the forward direction, the microprocessor directs the control signal "$T_3$" to the third electrically actuated proportional valve 112 to direct pressurized fluid to engage the third fluid clutch 86. The engagement of the third fluid clutch 86 effectively locks the ring gear 74 and the sun gear 78 to the final output shaft 56. Simultaneously therewith, the control signal "$C_1$" is directed to the first solenoid operated proportional valve 44 to direct pressurized fluid to the displacement controller 28 to change the displacement of variable displacement pump 26 at a controlled rate. As the displacement of the variable displacement pump 26 increases, pressurized fluid is directed through the conduit 34 to the variable displacement motor 32 and back to the variable displacement pump 26 through the conduit 36 in a closed loop. Pressurized fluid being directed through the variable displacement motor 32 causes the output shaft 40 of the variable displacement motor 32 to rotate. Since the output shaft 40 of the variable displacement motor 32 is operatively connected to the ring gear 74 and the third gear mechanism 80, the final output shaft 56 is caused to rotate at speed directly proportional to the speed of the output shaft 40. In the subject arrangement, the speed of the final output shaft 56 is slower than that of the motor's output shaft 40 due to the gear reduction from the motor's output shaft 40 to the ring gear 74. The signals "$S_2,S_3$" from the second speed sensor 92 and the third speed sensor 96 are transmitted to the microprocessor through the respective electrical lines 94,98. At the same time, the transmission input speed is sensed at the pump drive arrangement 30 by the first speed sensor 88 and the signal "$S_1$" thereof is transmitted to the microprocessor 24 through the electrical line 90.

Once the speed of the output shaft 40 reaches the speed desired by the command input signal "I", the command signal "$C_1$" being directed to the first solenoid operated proportional valve 44 is modified to maintain the displacement of the variable displacement pump 26 at a level to maintain the desired speed of the output shaft 40. As long as the operator does not make any adjustments to the command signal "I", the first, second and third speed sensor 88,92,96 continue to send respective control signals "$S_1,S_2,S_3$" to the microprocessor 24 which in turn continues to modify the control signal "$C_1$" to the first solenoid operated proportional valve 44 to maintain the proper displacement of the variable displacement pump 26. While operating at the desired low speed, the highest pressure signal in the conduits 34,36 is directed through the solenoid operated valve 50 to the spring chamber of the displacement controller 38 of the variable displacement motor 32 to insure that the displacement of the variable displacement motor 32 remains at its maximum displacement position.

If the operator elects to increase the speed of the machine to, for example, 5 mph, he moves the input controller 42 to change the command signal "I" to a level representative of the desired increased speed level. The microprocessor 24 senses the change in command signal "I" and directs the command signal "$C_1$" to the first solenoid operated proportional valve 44 to direct pressurized fluid to the displacement controller 28 to controllably increase the displacement of the variable displacement pump 26 toward its maximum displacement position. Once the variable displacement pump 26 reaches its maximum displacement position and the desired ground speed of 5 mph has not been reached, the microprocessor 24 maintains the first command signal "$C_1$" to the first solenoid operated proportional valve 44. At the same time, the microprocessor 24 directs the second command signal "$C_2$" to the second solenoid operated proportional valve 48 to controllably change the displacement of the variable displacement motor 32 from its maximum displacement position toward its minimum displacement position. However, since the highest pressure in the conduits 34,36 is being directed through the solenoid operated valve 50 to the spring chamber of the displacement controller 38, the displacement controller 38 cannot move. Once it is determined that the variable displacement pump 26 is at its maximum displacement, the microprocessor 24 directs a third command signal "$C_3$" to the solenoid operated valve 50 to interrupt the flow of pressurized fluid to the spring chamber of the displacement controller 38 and vents the pressurized fluid therefrom, thus allowing the displacement controller to move from its maximum displacement position. Since the second speed sensor 92 is continuously sensing the speed of the output shaft 40 of the variable displacement motor 32, the change in displacement of the variable displacement 32 is stopped once the speed of the output shaft 40 reaches its desired speed. Once the desired speed is achieved, the microprocessor modifies the second control signal "$C_2$" to maintain the displacement of the variable displacement motor 32 at the proper level to maintain the desired speed level of the output shaft 40.

The speed of the final output shaft 56, when operating in the low speed range, is controlled by increasing or decreasing the speed of the variable displacement motor 32. This may be done in a continuous fashion by manipulating the volumetric displacements of the pump and the motor as outlined above. Since the pump and motor displacements are changed in a smooth and continuous manner, an infinitely variable transmission is provided.

If it is desired to increase the speed of the machine from 5 mph in the low speed range to, for example, 7 mph in a high speed range, the operator makes an adjustment to the input controller 42 which generates the command signal "I" representative of the desired speed level of 7 mph. The microprocessor modifies the second command signal "$C_2$" to decrease the displacement of the variable displacement motor 32 towards its minimum displacement position which would be equivalent to approximately 6 mph. At this point, the microprocessor 24 senses that the displacement of the variable displacement motor 32 has reached its minimum displacement position and that it is necessary to shift the mechanical transmission 20 from its low speed range to its high speed range. Before the first fluid clutch 64 is activated, it is desirable that the speed of the input 60 of the first gear mechanism 58 is substantially equal to the output 62 of the first gear mechanism 58 that is connected to the planet and carrier gear 76. In order to insure that the speeds are the same, the speed of the output 62 can be adjusted by changing the displacement and therefore the speed of the variable displacement motor 32. Once the speeds are basically matched, the third fluid clutch 86 is de-activated and the first fluid clutch 64 is activated. Once the shift has been carried out, the speed of the planet and carrier gears remains at a fixed ratio of the speed of the engine 12 or the speed of the input 60 of the first gear mechanism 58.

In order to continue the increase in the speed of the machine, the microprocessor 24 modifies the second command signal "$C_2$" to the second solenoid operated proportional valve 48 to increase the displacement of the variable displacement motor 32 which effectively slows the rotational speed of the output shaft 40 thereof.

Since the final output shaft 56 is now being driven through the sun gear 78, reduction of the speed of the ring gear 74 results, in a well known manner, in an increase in the speed of the sun gear 78 due to the operation of the planetary arrangement 54. The displacement of the variable displacement motor 32 is continually increased to a point at which the desired level of 7 mph is achieved in the final output shaft 56. At this point, the second command signal "$C_2$" is modified to maintain the displacement of the variable displacement motor 32 at the desired speed.

The speed of the final output shaft 56 can be increased continuously by continuing to increase the displacement of the variable displacement motor 32 until it reaches its maximum displacement position and subsequently reducing the displacement of the variable displacement pump 26 toward its minimum displacement position. Once the displacement of the variable displacement pump 26 reaches its minimum displacement position, the speed of the output shaft 40 of the variable displacement motor 32 is at zero speed. At this point, the ring gear 74 is held at a zero speed position. The speed of the machine can be further increased by stroking the variable displacement pump 26 in the opposite direction to cause the variable displacement motor 32 to turn in the opposite direction which results in the ring gear 74 being rotated in an opposite direction. The speed of the machine can be increased by increasing the variable displacement pump to its maximum displacement and then decreasing the variable displacement motor to its minimum displacement until the design speed limits on the variable displacement motor 32 are reached.

It is recognized that as the speed of the machine is increased, the available torque at the final output shaft 56 is reduced. From the above description, it should be recognized that, in the subject embodiment, the speed of the machine can be increased from zero speed to some predetermined maximum level, for example 24 mph, at a smooth and continuous manner. This is accomplished by the interaction between the hydrostatic transmission 16, the mechanical transmission 20, the sensing arrangement 22, and the microprocessor 24.

In the subject arrangement, the machine can be operated in reverse through the same speed ranges as set forth above with respect to operating in a forward direction. When being operated in a reverse direction, the operator's command input signal "I" to the microprocessor 24 causes the variable displacement pump 26 to stroke in the direction to provide pressurized fluid through the conduit 36 to the variable displacement motor 32 resulting in the output shaft 40 thereof rotating in the direction opposite to that previously described with respect to traveling in a forward direction. As with the description with respect to traveling in a forward direction, the microprocessor 24 engages the third fluid clutch 86 of the second gear mechanism 80 causing the machine to operate in a low speed range and simultaneously operates the first solenoid operated proportional valve 44 to stroke the variable displacement pump 26 in the desired direction. Likewise, once the variable displacement pump 26 reaches its maximum displacement position, the microprocessor 24 actuates a second solenoid operated proportional valve 48 to stroke the motor toward its minimum displacement position. Once the motor reaches its minimum displacement position, the microprocessor disengages the third fluid clutch 86 and engages the second fluid operated clutch 72 of the second gear mechanism 52. Subsequently, to continue increasing the speed and reverse direction, the displacement of the variable displacement motor 32 is moved toward its maximum displacement position and once it reaches its maximum displacement position, the pump is stroked back toward its zero displacement position. In the manner noted above, to continue increasing the speed of the machine in reverse, the variable displacement pump 26 can be stroked in the opposite direction to cause the variable displacement motor 32 to rotate the output shaft 40 thereof in the opposite direction which likewise rotates the ring gear 74 in the opposite direction. Once the displacement of the variable displacement pump 26 reaches its maximum, the speed of the variable displacement motor 32, and subsequently the speed of the transmission final output shaft 56, can be further increased to its maximum speed by reducing the displacement of the variable displacement motor 36 to its minimum displacement position.

Other aspects, objects and advantages of the present invention can be obtained from a study of the drawings, the disclosure and the appended claims.

We claim:

1. An integrated power transmitting system for a machine having a source of power and a work system, comprising:

a hydrostatic transmission having a variable displacement pump drivingly connected to the source of power and a variable displacement motor having an output shaft and being fluidly connected to the variable displacement pump;

a microprocessor;

a control arrangement having first and second valve mechanisms and an input control mechanism operative to generate and deliver a command input to the microprocessor for controlling through the first valve mechanism the displacement of the variable displacement pump between its minimum and maximum displacement positions and once the variable displacement pump reaches its maximum displacement position to control the displacement of the variable displacement motor between its maximum and minimum positions in response to the command input establishing the desired speed of the output shaft of the variable displacement motor;

a mechanical transmission drivingly connected to the source of power and having a full range forward and reverse gear mechanism connected to the source of power, a planetary arrangement connected to both the full range forward and reverse gear mechanism and the output shaft of the variable displacement motor and selectively operative to sum the outputs from the gear mechanism and the variable displacement motor, and a final output shaft connected between the planetary arrangement and the work system, the planetary arrangement has a ring gear, a planet and carrier gears, and a sun gear, the output shaft of the variable displacement motor is drivingly connected to the ring gear, the full range forward and reverse gear mechanism is selectively connected to the planet and carrier gears and the sun gear is connected to the final output shaft;

a sensing arrangement operative to sense the input speed from the source of power to the variable displacement pump and the mechanical transmission, the speed of the final output shaft connected to the work system, the speed of the output shaft from the variable displacement motor, and the magnitude and direction of the desired input command; and the microprocessor being operative to receive the signals from the control mechanism and the sensing arrangement, process the signals and deliver a first set of control signals to the first valve mechanism to progressively control the displacement of the variable displacement pump and the variable displacement motor and a second set of control signals to the second valve mechanism to selectively control the operation of the mechanical transmission.

2. The system of claim 1 wherein the full range gear mechanism and the hydrostatic transmission selectively both act through the summing planetary arrangement to provide a continuing change in the speed of the final output shaft with a corresponding change in the speed of the output shaft from the variable displacement motor.

3. The system of claim 1 wherein the output shaft of the variable displacement motor is selectively connected to the final output shaft by a fluid clutch.

4. The system of claim 3 wherein the fluid clutch is engaged in response to the second valve mechanism receiving an electrical signal from the microprocessor.

5. The system of claim 2 wherein when the output shaft of the variable displacement motor is connected to the final output shaft through the fluid clutch, an increase in the speed of the output shaft from the variable displacement motor in one direction results in an increase in the speed of the final output shaft.

6. The system of claim 5 wherein when the fluid clutch is disengaged and both the full range gear mechanism and the hydrostatic transmission are both acting through the summing planetary arrangement, a decrease in the speed of the output shaft from the variable displacement motor reduces the speed of the ring gear and further increases the speed of the final output shaft.

* * * * *